United States Patent Office 3,419,581
Patented Dec. 31, 1968

3,419,581
SEPARATION AND RECOVERY OF DIAROYL-AMINOANTHRAQUINONES FROM THE REACTION OF DIAMINOANTHRAQUINONES AND AROYL HALIDES
Felix F. Ehrich, Westfield, and Edward E. Jaffe, Union, N.J., assignors to E. I. du Pont de Nemours and Company, Wilmington, Del., a corporation of Delaware
No Drawing. Filed Feb. 7, 1964, Ser. No. 343,236
9 Claims. (Cl. 260—377)

ABSTRACT OF THE DISCLOSURE

Processes for producing diaroylaminoanthraquinone pigments and dyestuffs from an aroyl halide and a diaminoanthraquinone comprising (1) heating to a temperature in the range from 130° to 180° C. a mixture of the reactants in a liquid diluent having a boiling point above 130° C. and selected from the group consisting of saturated hydrocarbons and polyhalogenated aromatic hydrocarbons, (2) cooling the reaction mixture so-obtained to below about 20° C., (3) mixing the cooled reaction mixture with sulfuric acid having a concentration of 96 to 99%, whereby the diaroylaminoanthraquinone reaction product is dissolved in the sulfuric acid and forms therewith a phase separate from the diluent phase, (4) separating and recovering the sulfuric acid phase, (5) rapidly diluting said sulfuric acid phase with cold water, whereby the reaction product is precipitated in finely divided form, and (6) recovering the finely divided product.

Methods of preparing diaroylaminoanthraquinone derivatives are known in the art. Such methods involve the reaction of an aroyl halide (which may be substituted) with a diaminoanthraquinone (for example, 1,5-diaminoanthraquinone) while suspended or dissolved in an inert diluent such as nitrobenzene. It is customary to have present an acid acceptor such as sodium carbonate and to isolate the insoluble product by filtering from the diluent or solvent followed by repeated extractions with portions of the solvent and by final removal of the residual solvent by steam distillation. This is a cumbersome process and has required multiple extractions to obtain products of reasonable purity. Furthermore, an additional step of particle size reduction has been necessary to obtain products having acceptable pigmentary properties.

Also, to be economical, such a process must re-use the diluent or solvent and this requires removal of soluble impurities by an extra step such as distillation. It is obvious that the art is in need of an improved and simplified process.

The principal object of this invention is to provide an improved process for the manufacture of diaroylaminoanthraquinone derivatives. A further object is to obtain these products in a state of high purity and excellent tinctorial intensity and at the same time in a particle size sufficiently small for use as pigments without further conditioning.

Now it has been found that the above-mentioned difficulties of prior art processes can be overcome and the described objectives can be met by processes of the present invention. More particularly, it has been found that diaroylaminoanthraquinone pigments and dyestuffs, especially 1,5-bis(2,4-dichlorobenzamido) anthraquinone, when prepared by reacting 2 moles of the appropriate aroyl halide with 1 mole of a diaminoanthraquinone in an inert, high-boiling, saturated hydrocarbon diluent such as kerosene or a chlorinated unsaturated hydrocarbon diluent, can be readily isolated from the diluent by adding to the reaction mixture sulfuric acid of 96 to 98% concentration in sufficient amount that the pigment dissolves in the acid layer leaving a relatively pure layer of the diluent which is readily separated from the acid layer. The pigment is regenerated by dilution of the acid solution with water, and by control of the regeneration conditions as described it may be obtained in a pigmentary particle size.

In one embodiment of this invention, 2 moles of an aroyl halide, which may be substituted, is reacted with 1 mole of 1,5-diaminoanthraquinone while suspended, or partially dissolved, in an inert saturated hydrocarbon liquid such as purified kerosene by heating to a temperature in the range of 130–170° C. for 3 to 4 hours. The reaction slurry is then cooled to below 20° C., whereupon an excess of 96 to 98% sulfuric acid is added and the mixture is stirred until the pigment has dissolved in the acid layer leaving a water-white kerosene layer behind. The acid layer is separated from the kerosene layer and then added slowly to a large excess of water under vigorous agitation to precipitate the pigment which is then recovered from the dilute acid solution by conventional means.

In a more specific embodiment, 2.2 moles (a 10% excess) of 2,4-dichlorobenzoylchloride is added to 1 mole of 1,5-diaminoanthraquinone suspended in a sufficient amount of purified kerosene to give a slurry having from 4 to 6 parts of kerosene per part of total reactants. The charge is heated to 150–160° C. and kept at that temperature for about 3.5 hours after which it is cooled to 20° C. and mixed with about 11 parts of $H_2SO_4$ (per part of product) with cooling of the mixture to 10–15° C. Stirring is continued until the kerosene layer is colorless and the acid layer is substantially free of suspended solids. The kerosene layer is removed by decantation and the acid layer is poured slowly into a well agitated mixture of ice and water in large excess. The subsequent isolation of the intense yellow pigment of high tinctorial strength is conventional except for the desirability of an oxidative treatment to remove impurities, thus giving more intense colors with less tendency to bleed. This may be done by an alkaline hypochlorite treatment, or it may be done by a chromic acid treatment of permanganate treatment directly in the diluted acid slurry before filtering.

The following examples illustrate the invention in still more detail. In all cases "parts" refer to parts by weight.

EXAMPLE 1

One mole (238 parts) of 1,5-diaminoanthraquinone is suspended in 4000 parts of purified kerosene along with 266 parts (2.5 moles) of sodium carbonate. The suspension is heated to 110–115° C. and 460 parts (2.2 moles) of 2,4-dichlorobenzoyl chloride is added in 10 minutes. The suspension is then further heated to 135–145° C. and kept at that temperature under good agitation for 3.5 hours. It is then cooled to about 20° C. and 6000 parts of 96% $H_2SO_4$ is added slowly. Foaming may occur during this addition but the color finally goes into solution leaving a water white kerosene layer which is then decanted from the acid solution. The acid solution is then added slowly over a 1 hour period to a well agitated mixture of about 30,000 parts water and 30,000 parts ice, maintained at 0–2° C. The precipitated pigment is filtered and washed acid free. The filter cake is suspended in 30,000 parts water containing 152 parts sodium hydroxide to which is then added 4000 parts of 5.25% sodium hypochlorite solution. The slurry is heated to 90–100° C. and kept at that temperature with agitation for 1 hour while maintaining the pH in the range of 9.0 to 12.0, filtered, washed free of soluble salts and dried at 60° C. to give 455 parts of a yellow pigment.

When this powder is dispersed in a conventional manner in an acrylic resin lacquer vehicle, panels coated therewith show substantially no change in color after 500 hours exposure in a "Weatherometer." Such coating compositions are intense yellow compositions of high strength, exhibiting both higher strength and more intensity than products made in nitrobenzene and isolated by filtering and extraction in additional nitrobenzene followed by appropriate milling.

EXAMPLE 2

One mole (238 parts) of 1,5-diaminoanthraquinone is suspended in 2800 parts of purified kerosene and the mixture is heated to 110–115° C. Two and two-tenths moles (460 parts) of 2,4-dichlorobenzoyl chloride is then added rapidly and the charge heated with good agitation to 150–160° C. and kept at that temperature for 3.5 hours. It is then cooled to 20° C. and 5000 parts of cold 98% $H_2SO_4$ is added rapidly with cooling so that the temperature does not at any time exceed 25° C. and is kept in the range of 10–15° C. until the kerosene layer is clear and the acid layer is substantially free of suspended solids. The kerosene layer is decanted and the acid solution added dropwise to 20,000 parts of a water-and-ice mixture, maintaining the temperature at 0–5° C. thus precipitating a brownish-yellow solid. This solid is filtered, washed acid free and suspended in about 20,000 parts of water containing about 85 parts of sodium hydroxide, and 3560 parts of a commercial 15% solution of sodium hypochlorite is added over 3 hours while holding at 80–90° C. and maintaining the pH in the range of 10.0 to 11.0. The slurry is filtered, washed free of soluble salts and dried at 60° C. to give 460 parts (79.2% theory) of an intense yellow powder in every way equivalent to the product of Example 1.

EXAMPLE 3

In order to reuse recovered kerosene, it is only necessary that it be free from entrained sulfinic acid. A careful separation should leave acid-free water-white kerosene or it may be further stirred with an aqueous solution of sodium carbonate, draining off the heavier aqueous layer and heating the kerosene for a short time at 120–150° C. to distill off residual water.

Assuming that the acid layer in Example 2 is drawn from the bottom of the reaction vessel the recovered water-white kerosene, plus any necessary additional amount to compensate for mechanical and evaporative losses is used without removal from the vessel as the inert diluent in repeating Example 2 in every other respect.

The product obtained is identical in every way with that of Example 2 and the yield is 79.5% of theory.

EXAMPLE 4

This example illustrates a variation in the method of drowning of the sulfuric acid solution. The process of Example 2 is repeated to the point where the sulfuric acid solution is ready for regeneration of the pigment and has been cooled to about 5° C. This solution is then introduced continuously through a small orifice into the center of a stream of water flowing through a constricted tube in a state of turbulent flow, the ratio of water to acid being about 30 to 1 and the temperature rise being of the order of 5° to 10°. The collected slurry is then filtered, washed free of soluble salts and reslurride in about 8000 parts of water containing about 25 parts of sodium hydroxide which is adjusted as needed to give a pH of about 10. It is heated to 80–90° C. and treated with portions of 15% sodium hypochlorite as needed to maintain a positive reaction on starch-KI paper over a 3-hour period adding more NaOH as needed to maintain a pH of 10. The slurry is then filtered hot, washed free of soluble salts and dried at 60° C. to give an intense yellow pigment. When dispersed in a suitable vehicle, the composition has stronger and more intense color than the product of Example 2.

EXAMPLE 5

One mole (238 parts) of 1,5-diaminoanthraquinone is suspended in 2800 parts of purified kerosene to which 460 parts of 2,4-dichlorobenzoyl chloride is added. The mixture is then heated with good agitation to 150–160° C., kept at that temperature for 3 hours and then cooled to about 15° C. Five thousand parts of cold 98% $H_2SO_4$ is added rapidly with cooling to keep the temperature below 25° C. with subsequent cooling to 10–15° C. along with vigorous agitation until the kerosene layer is clear and the acid layer is substantially free of suspended solids. After separating the two layers the acid solution is cooled to about 5° C. and then introduced continuously through a small orifice into the center of a stream of cold water flowing under pressure through a constricted tube in a state of turbulent flow, the ratio of water to acid being about 10 to 1 and the temperature rise being on the order of 15° C. The resulting strongly acid slurry is treated by adding an aqueous solution of 730 parts of chromic oxide ($CrO_3$) thereto, heating to 90–95° C. and holding at that temperature for 3 hours. It is then filtered, washed free of soluble salts and of acid, and dried at 60° C. to give about 460 parts of yellow powder which is quite similar to the product of Example 4.

Seven hundred thirty parts of chromic oxide in this example may be replaced by 1095 parts of sodium dichromate ($Na_2Cr_2O_7 \cdot 2H_2O$) to give identical results.

EXAMPLE 6

Forty-seven and six-tenths parts of 1,5-diaminoanthraquinone is added to 800 parts of trichlorobenzene and the mixture heated to 110° C. to drive off moisture which might be present. Ninety-two parts (10% excess) of 2,4-dichlorobenzoyl chloride is added quickly and the mixture heated to 140–150° C. and held at that temperature for 3 hours. It is cooled to about 25° C. and poured slowly with good agitation into 1000 parts of 98% $H_2SO_4$ at about 10° C. When the color is in solution, the temperature is allowed to rise to about 20° C. to insure that the trichlorobenzene is in liquid form and the lower layer of sulfuric acid is withdrawn. The pigment is regenerated therefrom by pouring the acid layer into water-ice mixture, filtering, washing, and treating with sodium hypochlorite at a pH of about 10.0 as set forth in Example 2. It is finally filtered, washed and dried to give a yellow pigment with properties quite similar to those of the product of Example 2.

EXAMPLE 7

Forty-seven and six-tenths parts of 1,5-diaminoanthraquinone is added to 800 parts of o-dichlorobenzene which is then heated to 120° C. whereupon 92 parts of 2,4-dichlorobenzoyl chloride (10% excess) is added quickly. The charge is heated to 160° C. and held at 160° C. (±5°) for 6 hours. After cooling to room temperature (±20° C.), it is added slowly to 1000 parts 98% $H_2SO_4$, cooled to about 10° C. When the diluent phase is substantially colorless the liquid layers are allowed to separate and the acid layer withdrawn. The pigment is regenerated and purified as in Example 6.

Since both trichlorobenzene and o-dichlorobenzene have a perceptible solubility in 98% $H_2SO_4$ (without noticeable decomposition) there is always a small amount of the diluent present in the pigment after regeneration. During the oxidative treatment, this is largely removed by steam distillation but its presence at this stage has a remarkably beneficial effect on the texture of the products. The products of Examples 6 and 7 are very soft, talc-like products without perceptible odor of the diluents.

EXAMPLE 8

Two hundred thirty-eight parts of 1,5-diaminoanthraquinone is reacted with 460 parts of 2,4-dichlorobenzoyl chloride in 2800 parts of purified kerosene as described in more detail in Example 5. Five thousand parts of cold 98% $H_2SO_4$ is added rapidly with cooling to the kerosene layer, as also described in Example 5, after which the two layers of liquid are separated to give an acid solution which is then drowned through a turbulent orifice as also described in Example 5. The final slurry of pigment is thus suspended in a dilute sulfuric acid solution of approximately 10% concentration.

The total amount of the slurry (about 58,000 parts) is heated to about 80° C. and 292 parts of dry potassium permanganate is added to the slurry which is kept at the temperature of 80° C. and stirred for about 20 minutes after which a second increment of 292 parts of dry potassium permanganate is added followed by stirring, adding a third increment of potassium permanganate, stirring and finally adding a fourth increment of potassium permanganate to make a total of about 1168 parts of potassium permanganate, and the slurry is then cooled to 75° C. whereupon a portion of 810 parts of sodium bisulfite is sifted into the slurry slowly to reduce the manganese dioxide to a water-soluble manganese salt. The charge is then heated substantially to the boil, whereupon it is filtered, washed free of acid and soluble salts, washed with dilute (2%) ammonium hydroxide and finally washed further with water and dried to give 454 parts (77.6% yield) of a brilliant yellow powder which is superior in intensity and in freedom from bleeding in solvents to the product of Example 5.

Instead of adding the potassium permanganate as a dry crystal to the slurry, the same total amount of potassium permanganate may be previously dissolved in hot water to about a 5% solution which is added continuously over a period of about 100 minutes to the slurry, all other procedures being substantially the same, to give about 480 parts (82.3% yield) of an equivalent product.

As can be seen from the foregoing description, a very important aspect of the invention is the use of a suitable diluent liquid in the synthesis of the diaroylaminoanthraquinone. In addition to having a boiling point above about 130° C. where the reaction may take place, preferably above 160° C., it must be chemically inert to the reactants and it must be insoluble in concentrated sulfuric acid. This limits the useful liquids largely to the higher boiling saturated hydrocarbons, their halogenated derivatives and the polyhalogenated aromatic hydrocarbons. Purified kerosene fulfills the requirements in an ideal fashion, but the higher boiling mineral oils can be used, as well as o-dichlorobenzene and trichlorobenzene, for instance. Where kerosene is mentioned in the following discussion, it is understood to include other suitable liquids.

The amount of liquid is critical only in the need to maintain a fluid, readily stirrable reaction mass. An amount of kerosene in the order of 4 to 5 times the weight of the total solid reactants has proved adequate and somewhat less can be used without difficulty. The point at which poor agitation results is readily apparent. Considerably larger amounts may be used, but such use is uneconomical in that it reduces the capacity of the equipment and entails higher costs of recovery.

Complete solution of diaroylaminoanthraquinones in sulfuric acid requires sulfuric acid of at least about 96% concentration and at this concentration the solubility is low thus requiring up to about 40 parts of acid per part of pigment. However, a slight increase in concentration to about 98% acid has a pronounced effect on solubility. Complete solution is obtained in 7 to 10 parts of 98% $H_2SO_4$. When the concentration exceeds about 99%, and especially in the presence of even traces of free $SO_3$, there is evidence of degradation or sulfonation or both. Thus, acceptable results appear to be obtained only in the relatively narrow range of about 96 to 98% $H_2SO_4$.

From considerations known to the art, it should make little difference how the sulfuric acid and the kerosene slurry of the pigment are mixed, but in practice it has been observed that if the sulfate of the pigment is permitted to form as an insoluble product, it dissolves very slowly in the remaining acid. Hence, it is desirable that the operations be so arranged that there is always a substantial excess of acid in contact with the pigment slurry. One good way to insure such conditions is to add the kerosene slurry of the pigment to the cold sulfuric acid in another vessel. Although a preferred operating procedure, such a manner of operation is not critical to the invention.

Higher temperatures improve solubility but result in tinctorial degradation. It is desirable to limit the maximum temperature to about 25° C. with a preferred maximum of 15° C. and a preferred operating range of 5–10° C. The time of exposure influences the permissible temperature. Exposures of several hours are possible at a temperature in the range of 5.10° C. whereas more than a few minutes, say a half hour at most, at 75° C. may cause some degradation in color. It is preferred that the time of exposure be kept as short as possible.

In the preferred temperature range of 5–10° C. the required amount of sulfuric acid to obtain complete solution of the pigment varies from about 15 parts of 96% $H_2SO_4$ per part of pigment to about 8 parts of 98% $H_2SO_4$ per part of pigment. Slightly larger amounts are often used and more is not harmful but is uneconomical both because of the unnecessary use and also because of the problem of neutralization and disposal. The preferred usage is about 10 parts of 987 $H_2SO_4$ per part of pigment.

The separation of the kerosene layer, which is always on top, may be brought about in any convenient fashion. It may be decanted or syphoned from the acid, or the acid layer may be withdrawn from below the kerosene. A perfect separation is not essential since a small amount of kerosene in the final slurry is not harmful nor does a small amount of acid hinder the re-use of the kerosene providing it is neutralized which may be done as illustrated in Example 3.

The regeneration of the pigment from the acid solution is readily accomplished by dilution of the acid with water. The manner of doing this is not critical to the broad concept of this invention, but the detailed procedure of regeneration lends itself to variations which do profoundly influence the crystalline character and thus the tinctorial properties of the resulting pigments. These variations in conditions of regeneration are related in general to the rate of dilution of the acid. At one extreme, one may consider the very slow dilution which might occur through the absorption of water from a moist atmosphere or, not quite so slowly, by the cautious addition of water to the well agitated acid slurry. Such slow dilution of the acid generally results in the formation of large crystals of the dyestuff and is not preferred for the purposes of this invention, although it is a useful means of purification.

To obtain products with acceptable pigmentary properties, it is preferred that the dilution of the acid be very rapid, approaching instantaneous where possible. This may be accomplished in various ways, such as pouring the acid solution slowly into a large volume of cold water under vigorous agitation to give very small particles and excellent pigmentary properties. Drop-wise addition of the acid to the water may also be practiced to advantage. Perhaps the ultimate in rapid mixing is obtained when the acid solution is introduced into the water in a region of turbulent flow such as described in Example 4. The details of the regeneration shown in said Example 4 are not critical. Thus, the ratio of water to acid may vary widely from the ratio of 30 to 1 shown in Example 4, giving a temperature rise of 10–15° C., to as little as 6 to 1 which may give a temperature rise of 30.35° C. without harm. This general method of drowning an acid solution of a dyestuff has been described in U.S. Patent 2,334,812 (Detrick & Brandt to Du Pont). Special devices have been made for effecting the drowning under conditions of high turbulence but the invention is not dependent upon the use of any specific apparatus.

The examples hereinabove show an oxidative treatment as a step in the preparation of products with the desired tinctorial properties. The exact chemical reactions which occur during this oxidative treatment are not clear but the step appears to remove certain impurities which cause dullness and other undesirable effects on the color, such as poor lightfastness and bleeding in many coating composition vehicles. Whatever the impurities which are destroyed, various oxidation treatments are possible so that the details of the step are not critical. One method, which has been quite successful, uses alkaline sodium hypochlorite as the agent. The alkalinity requires some control to a pH not above about a pH of 12 because greater alkalinity than this tends to hydrolyze the product and reduce the yield. To minimize the tendency to hydrolysis, it is preferred to keep the pH even lower, say about pH 10.0. Sodium hypochlorite is commercially available as solutions of various strengths or it can be prepared by bubbling chlorine through a solution of sodium hydroxide. The form in which it is used is unimportant as long as the presence of an excess is maintained for the time necessary to destroy the undesired contaminants. This excess is readily identified by the conventional test on starch-iodide paper and should be maintained by the addition of increments as long as it appears to be consumed.

As shown in Examples 5 and 8 it is also possible to carry out oxidative treatment under acid conditions using either chromic acid or potassium permanganate as the oxidant. Since the regenerated slurry is already acidic, it is only necessary to add a source of the oxidant which, in the case of chromic acid may be chromic acid itself ($CrO_3$) or, equally as satisfactory, a solution of sodium bichromate. If the permanganate ion is used as the oxidizing agent, it is preferable to use potassium permanganate although other permanganate salts could be used with equal success. As in the case of the sodium hypochlorite, the amount of oxidant should be in slight excess over that consumed as determined by adding increments until no more oxidant is consumed. In the case of the chromate, any reasonable excess will do no harm as it is removed in the subsequent filtration and washing. In the case of the permanganate ion as typified in potassium permanganate, it is found that the best overall results are obtained when the amount of potassium permanganate is substantially twice the weight of the solid in the slurry which is being treated. With this amount of oxidant, the average yield is about 82–83% of theory. If the potassium permanganate is reduced, there is some increase in yield but a reduction in the benefits derived from oxidation, particularly in the intensity of the color and in the tendency to bleed. Amounts of potassium permanganate below about that equal in weight to the solid in the slurry give inferior results.

The acid concentration at the point of oxidation with either chromate ion or permanganate ion may be varied over a quite wide range from as little as about 5% acid concentration up to as much as 16–20% acid concentration.

In the case of using permanganate ion as the oxidizing agent, the immediate result is the formation of manganese dioxide which is an undesirable impurity in the pigment. Subsequent to the oxidation reaction, therefore, it is necessary to add a reducing agent to transform the manganese dioxide to a solube manganese salt. Example 8 has shown the use of sodium bisulfite for this purpose but sodium sulfite is equally valuable and other mild reducing agents including hydrogen peroxide and sulfur dioxide are useful for this purpose.

Other acidic oxidizing agents may also be used, such as, for instance, dilute nitric acid.

The process of this invention is generally applicable to diaroylaminoanthraquinone dyestuffs as well as to the specific compound shown as preferred in the examples. Thus, the unsubstituted 1,5-dibenzamidoanthraquinone is a well-known vat dyestuff which has been commonly made in the past by the reaction of benzoyl chloride with 1,5-diaminoanthraquinone in nitrobenzene with the attendant problems of isolating from that solvent. Reaction in kerosene and extraction therefrom with concentrated sulfuric acid followed by regeneration from the acid as described in detail above is a useful process of making this dyestuff. Other compounds which may be made in like manner by reaction of the appropriate intermediates include:

(1) 1,5-bis(3,4-dichlorobenzamido)anthraquinone
(2) 1,5-bis(3,5-dichlorobenzamido)anthraquinone
(3) 1,4-bis(m-trifluoromethylbenzamido)anthraquinone
(4) 1,5-bis(m-bromobenzamido)anthraquinone
(5) 1,8-dibenzamidoanthraquinone
(6) 1,8-bis(2,4-dichlorobenzamido)anthraquinone
(7) 1,4-dibenzamidoanthraquinone
(8) 1,4-bis(m-methoxybenzamido)anthraquinone It will be obvious that mixtures of these and other related compositions can also be made by this process. Such mixtures can be prepared deliberately or they can come about by virtue of impurities present in the principal raw materials.

We claim:
1. In a process for producing diaroylaminoanthraquinone pigments and dyestuffs by reaction of an aroyl halide and a diaminoanthraquinone the improvement which comprises (1) heating to a temperature in the range from 130° to 180° C. a mixture of the reactants in a liquid diluent having a boiling point above 130° C. and selected from the group consisting of saturated hydrocarbons and polyhalogenated aromatic hydrocarbons, (2) cooling the reaction mixture so obtained to below about 20° C., (3) mixing the cooled reaction mixture with sulfuric acid having a concentration of 96 to 99%, whereby the diaroylaminoanthraquinone reaction product is dissolved in the sulfuric acid and forms therewith a phase separate from the diluent phase, (4) separating and recovering the sulfuric acid phase, (5) rapidly diluting said sulfuric acid phase with cold water, whereby the reaction product is precipitated in finely divided form, and (6) recovering the finely divided product.

2. A process of claim 1 wherein the reactants are a dichlorobenzoyl chloride and 1,5-diaminoanthraquinone and the product produced is a 1,5-bis(dichlorobenzamido)anthraquinone.

3. A process of claim 1 wherein the reactants are 2,4-dichlorobenzoylchloride and 1,5-diaminoanthraquinone and the product produced is 1,5-bis(2,4-dichlorobenzamido)anthraquinone.

4. A process of claim 1 wherein the liquid diluent used in step (1) is purified kerosene.

5. A process of claim 1 wherein the liquid diluent used in step (1) is trichlorobenzene.

6. A process of claim 1 wherein the liquid diluent used in step (1) is o-dichlorobenzene.

7. In a process for producing diaroylaminoanthraquinone pigments and dyestuffs by reaction of an aroyl halide and a diaminoanthraquinone the improvement which comprises (1) heating to a temperature in the range from 130° to 180° C. a mixture of the reactants in a liquid diluent having a boiling point above 130° C. and selected from the group consisting of saturated hydrocarbons and polyhalogenated aromatic hydrocarbons, (2) cooling the reaction mixture so-obtained to below about 20° C., (3) mixing the cooled reaction mixture with sulfuric acid having a concentration of 96 to 99% whereby the diaroylaminoanthraquinone reaction product is dissolved in the sulfuric acid and forms therewith a phase separate from the diluent phase, (4) separating and recovering the sulfuric acid phase, (5) rapidly diluting said sulfuric acid phase with cold water, whereby the reaction product is precipitated in finely divided form, (6) dissolving an oxidizing agent in the diluted mixture of sulfuric acid and reaction product, (7) heating the so-obtained mixture to about from 70 to 95° C. for about from 1 to 4 hours, and (8) recovering the treated, finely divided product.

8. A process of claim 7 wherein the oxidizing agent is a chromate compound.

9. A process of claim 7 wherein the oxidizing agent is a permanganate compound.

References Cited

UNITED STATES PATENTS 2,041,550  5/1936  Krzikalla et al. _____ 260—377

LORRAINE A. WEINBERGER, *Primary Examiner.*

H. C. WEGNER, *Assistant Examiner.*